(No Model.) 2 Sheets—Sheet 1.
H. H. BUFFUM.
PAWL.
No. 595,556. Patented Dec. 14, 1897.
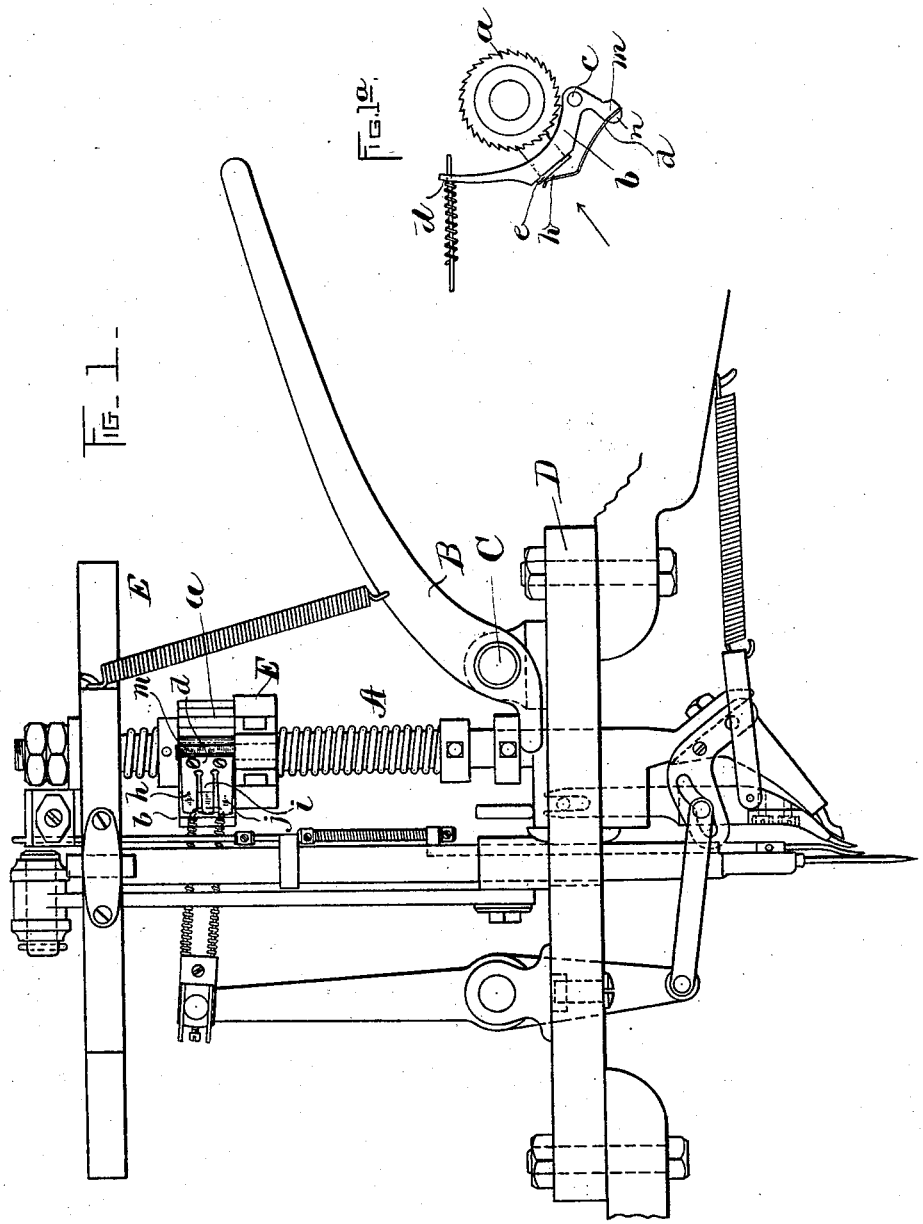
WITNESSES:
A. D. Harrison.
P. W. Pezzetti.
INVENTOR:
H. H. Buffum
by Knight Bros & Quimby
attys.

(No Model.) 2 Sheets—Sheet 2.
H. H. BUFFUM.
PAWL.
No. 595,556. Patented Dec. 14, 1897.
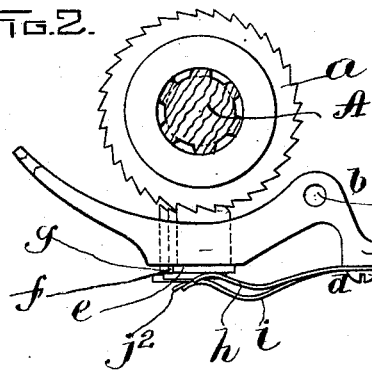
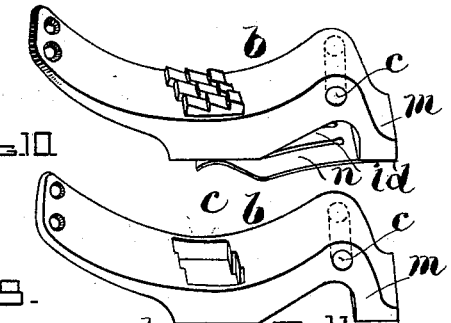
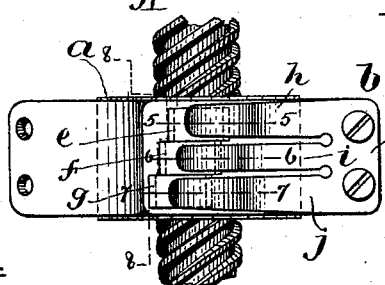
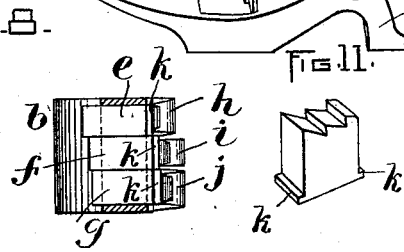
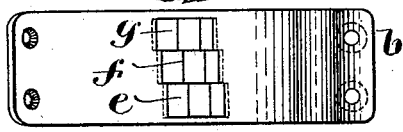
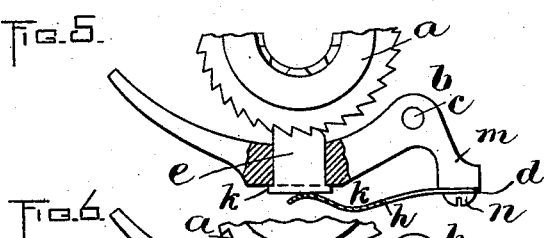
WITNESSES
A. D. Harrison.
P. W. Pezzetti
INVENTOR.
H. H. Buffum
by Wright, Brown & Quinby
attys.

UNITED STATES PATENT OFFICE.

HERBERT H. BUFFUM, OF ABINGTON, MASSACHUSETTS.

PAWL.

SPECIFICATION forming part of Letters Patent No. 595,556, dated December 14, 1897.

Application filed September 25, 1896. Serial No. 606,942. (No model.)

*To all whom it may concern:*

Be it known that I, HERBERT H. BUFFUM, of Abington, in the county of Plymouth and State of Massachusetts, have invented certain new and useful Improvements in Pawls, of which the following is a specification.

Of the drawings, Figure 1 shows a portion of a McKay sewing-machine, which I have chosen to show as a type of a machine to which my invention may be applied, it being understood that I do not mean to limit the use of my invention to a machine of this character, but merely to show how it may be used. Fig. 1$^a$ is a plan view of a ratchet and pawl employed in the machine shown in Fig. 1. Fig. 2 is a similar plan view of the same, somewhat enlarged. Fig. 3 is a side elevation. Fig. 4 is a side view of the pawl reversed. Figs. 5, 6, and 7 are respectively sections on the lines 5 5, 6 6, and 7 7 of Fig. 3. Fig. 8 is a section on the line 8 8 of Fig. 3. Figs. 9 and 10 are perspective views of a pawl respectively with and without the movable teeth and the springs therefor. Fig. 11 is a perspective view of one of the teeth.

Referring to Fig. 1, A is the longitudinally-movable screw-shaft connected with the presser-foot of a McKay sewing-machine. The means for lifting the said foot G consist of a lever B, pivoted or fulcrumed at C on a support D. $a$ is a ratchet-wheel having internal threads corresponding to the threads on the screw-shaft A. The ratchet-wheel is held from vertical movement by a nut-frame E, so that as the shaft A is elevated the ratchet-wheel $a$ will be rotated. Hence by engaging the teeth of the ratchet-wheel $a$ after the shaft A has been moved to the desired point the said ratchet may be prevented from rotating backwardly and the shaft be kept from dropping.

The pawl $b$ is pivoted at $c$ and is connected by a spring $d$ with a pivoted lever F. The presser-foot G has an attachment H with a slot H', in which is secured a pivot-pin on the end of a connecting-rod I, the said rod being pivoted to the end of the lever F, so that when the presser-foot is raised by the lever B the spring $d$ throws the pawl $b$ into engagement with the ratchet-wheel. The pawl is provided with independently-movable teeth $e f g$, which in that form of my invention illustrated in Figs. 1$^a$ to 11, inclusive, are arranged side by side, being acted upon by springs $h i j$, respectively, which press upon their upper faces. Each tooth is provided at its outer end with flanges $k$, which act as stops to prevent it from passing through the aperture in the body of the pawl, and is provided with serrations of a size equal to the teeth in the ratchet-wheel, so as to coact therewith. The three teeth $e f g$ are arranged side by side, but they are not arranged so as to have the serrations in alinement with each other. On the other hand, they are arranged so that the serrations on the next adjacent tooth are slightly out of alinement with the preceding one, or so that the serrations are differentially spaced. Preferably each tooth is arranged just a little forward of the preceding one, so that the total distance between the first serration on the first tooth and the first serration on the third tooth is equal to the length of one tooth of the ratchet-wheel. Thus if there are three teeth the teeth of the ratchet may be engaged by any one of them, and the backward thrust of said ratchet may at most be only one-third of the length of the tooth thereof.

I do not limit myself to the use of three teeth, as I may employ two, four, or any other number that may be desired, thus increasing slightly or decreasing the backlash of the ratchet, as will be understood.

By referring to Figs. 3 to 7, inclusive, it will be seen that the pawl is in engagement with the ratchet-wheel, so as to prevent its rotating in a backward direction. It happens in this case that the tooth $e$ has engaged the said ratchet, and hence the teeth $f$ and $g$ are thrust back and are not in engagement therewith, or, in other words, the serrations on the teeth $f$ and $g$ do not exactly fit in the teeth of the ratchet. If it should happen, however, that the serrations on the tooth $e$ do not precisely fit the teeth of the ratchet when the latter comes to a stop, the serrations on the tooth $f$ or on the tooth $g$ might correspond with the said teeth and lock the said ratchet against backward movement. The springs $h i j$ for the three movable teeth may be all formed of a single strip $l$ of spring metal, which is secured to an arm $m$, projecting out from the pawl, by screws $n$.

By reason of the teeth being all slidably mounted in the pawl and pressed against the ratchet by the springs secured to the latter the pawl itself may be drawn toward the ratchet with a yielding pressure, so as to always cause an engagement with the ratchet and prevent even a slight backlash, and, moreover, by forming each tooth or slide with a series of serrations, teeth, or notches each tooth or slide engages more than a single tooth of the ratchet, and hence a more rigid engagement between the pawl and the ratchet is effected. In addition to this the danger of any of the parts breaking is greatly reduced, as the strain does not fall upon a single tooth of the ratchet, but upon two or more teeth thereof.

Having thus explained the nature of my invention and described ways of constructing and using the same, without attempting to set forth all the forms in which it may be made or all the modes of its use, I declare that what I claim is—

1. In combination, a rotating screw-shaft, a ratchet having internal threads to receive the screw-shaft, a pivoted pawl, movable toward and from said ratchet, a spring for drawing said pawl yieldingly toward the ratchet, a series of differentially-spaced teeth slidably mounted in said pawl, and a spring for said teeth, substantially as described.

2. In combination, a rotating screw-shaft, a ratchet having internal threads to receive the screw-shaft, a pivoted pawl, movable toward and from said ratchet, a spring for drawing said pawl yieldingly toward the ratchet, a series of differentially-spaced slides mounted in said pawl with their faces longitudinally thereof, each slide having two or more teeth to engage two or more teeth of the ratchet, and a spring for said slides, substantially as described.

In testimony whereof I have signed my name to this specification, in the presence of two subscribing witnesses, this 16th day of June, A. D. 1896.

HERBERT H. BUFFUM.

Witnesses:
A. D. HARRISON,
P. W. PEZZETTI.